(12) United States Patent
Berwanger et al.

(10) Patent No.: US 8,493,990 B2
(45) Date of Patent: *Jul. 23, 2013

(54) CYCLICAL TIME-BASED COMMUNICATION SYSTEM, USER IN SUCH A SYSTEM AND TRANSMISSION METHOD

(75) Inventors: Josef Berwanger, Poing (DE); Anton Schedl, Munich (DE); Ralf Belschner, Pliezhausen (DE); Peter Lohrman, Eislingen (DE); Matthias Kuehlewein, Tuebingen (DE); Thomas Fuehrer, Gerlingen (DE); Bernd Mueller, Korntal-Muenchingen (DE); Florian Hartwich, Reutlingen (DE); Robert Hugel, Karlsruhe (DE); Carsten Gebauer, Abstatt (DE)

(73) Assignee: Robert Bosch GmbH, Stuttgart (DE)

( * ) Notice: Subject to any disclaimer, the term of this patent is extended or adjusted under 35 U.S.C. 154(b) by 328 days.

This patent is subject to a terminal disclaimer.

(21) Appl. No.: 12/954,248

(22) Filed: Nov. 24, 2010

(65) Prior Publication Data

US 2011/0064090 A1    Mar. 17, 2011

Related U.S. Application Data

(63) Continuation of application No. 10/500,657, filed as application No. PCT/EP02/13700 on Dec. 4, 2002, now Pat. No. 7,912,080.

(30) Foreign Application Priority Data

Jan. 4, 2002    (DE) .................................. 102 00 201

(51) Int. Cl.
*H04J 3/00*    (2006.01)

(52) U.S. Cl.
USPC ........................................... 370/442; 370/498

(58) Field of Classification Search
None
See application file for complete search history.

(56) References Cited

U.S. PATENT DOCUMENTS

| | | | | |
|---|---|---|---|---|
| 5,600,312 | A * | 2/1997 | Willard et al. | 340/7.27 |
| 6,353,615 | B1 * | 3/2002 | Bohne | 370/442 |
| 6,606,670 | B1 * | 8/2003 | Stoneking et al. | 710/14 |
| 6,842,808 | B2 * | 1/2005 | Weigl et al. | 710/117 |
| 7,171,579 | B2 * | 1/2007 | Weigl et al. | 713/600 |
| 2001/0018720 | A1 * | 8/2001 | Weigl et al. | 710/117 |

* cited by examiner

*Primary Examiner* — Alex Skripnikov
(74) *Attorney, Agent, or Firm* — Kenyon & Kenyon LLP (57) ABSTRACT

A cyclical time-based communication system, for the transmission of data (DATA) between users, comprising a databus and users connected thereto. The data transmission occurs within cyclical repeating timeframes, each with at least two timeslots. Each timeslot is provided for the transmission of a message (Ni). A message (Ni) comprises at least part of the data (DATA) and each message (Ni) is provided with a code (ID). The bandwidth available for data transmission may be better utilized, if the code (ID) is placed within the message (Ni), each message (Ni) is additionally provided with time information concerning the timeslot which may be extracted from the code, and at least one of the timeslots may be used for transmission of various messages in various cycles. In a preferred embodiment the information relating to the current cycle comprises an ordinal number. In the simplest case the number has two values 0 and 1.

14 Claims, 5 Drawing Sheets

CYCLICAL TIME-BASED COMMUNICATION SYSTEM, USER IN SUCH A SYSTEM AND TRANSMISSION METHOD

CROSS-REFERENCE TO RELATED APPLICATIONS

This application is a continuation of U.S. application Ser. No. 10/500,657, filed Feb. 14, 2004, now U.S. Pat. No. 7,912,080, issued Mar. 22, 2011, which is the national stage application of PCT/EP02/13700, filed Dec. 4, 2002, both of which are incorporated by reference in their entireties.

BACKGROUND OF THE INVENTION

1. Field of the Invention

The present invention relates to a cycle-based communication system for transmitting useful data between users of the system. The communication system includes a data bus and the users connected to it. The data transmission is effected within cyclically repeating timeframes, each having at least two timeslots. Each timeslot is intended for transmitting one message. One message includes at least some of the useful data, and each message is assigned an identifier.

The invention furthermore pertains to a method for transmitting useful data in a cycle-based communication system between users of the system, over a data bus to which the users are connected. The useful data are transmitted within cyclically repeating timeframes, each having at least two timeslots. In each timeslot, one message is transmitted. At least some of the useful data is stored in a message. Each message is assigned an identifier.

2. Description of the Related Art

From the prior art, it is known to use communication systems of the type defined above in motor vehicles or other means of transportation (such as aircraft, trains, and ships) for exchanging data between control units. The control units serve to control or regulate certain functions of the means of transportation, such as drive functions (for instance, the driving engine and transmission), safety functions (such as anti-lock brake system or ABS, traction control or ASR, and electronic stability program or ESP) or comfort functions (such as air-conditioning of the interior).

In the known communication systems, the data exchange between the control units essentially takes place in serial form over so-called bus systems. For the data traffic to be reliable and regulated, an agreement about the way in which data will be transmitted, or so-called protocol, is necessary. FlexRay is one such protocol, which makes it possible to transmit serial data with time control over a bus system. The data are packed into a message in a data frame which additionally includes data for controlling and securing the data traffic. These messages are transmitted cyclically in a fixedly predetermined order, or so-called timeslots.

In FlexRay, one timeframe (basic cycle) comprises timeslots that are fixed in each fundamental cycle (for high-priority messages), and variable timeslots (for low-priority messages or for messages with an altered or longer cycle time). The division of a fundamental cycle into fixed and variable timeslots is freely selectable and is influenced by the requirements of the data transmission. The requirements are predetermined for instance by the application within which the data transmission is to be effected.

In FlexRay, according to the prior art different messages can be transmitted within one fundamental cycle only at different times. Depending on the number of messages to be transmitted, the length of one fundamental cycle is thus determined. Even if a plurality of low-priority messages need to be transmitted only every $n^{th}$ fundamental cycle, still a waiting time must be reserved at least for each of these messages. Thus the timeframe includes as many timeslots as there are different messages to be transmitted in any one fundamental cycle. If a message is not transmitted in a certain cycle, the timeslot for this message remains empty in that cycle.

The shortest repetition time for "fast" messages, that is, messages to be transmitted often, accordingly depends on the fundamental cycle. The longer the fundamental cycle is, the more infrequently can "fast" messages be sent. To allow the "fast" messages to be repeated more often despite a relatively long fundamental cycle, it is known to assign the messages a plurality of timeslots within one fundamental cycle. However, this has the disadvantage that a strict periodicity can be attained only with difficulty, if at all, and that in the implementation, the memory requirement may increase, since a plurality of message objects must be procured for one message.

From Lonn, H. et al: Synchronisation in Safety-Critical Distributed Control Systems, Algorithms and Architectures for Parallel Processing, 1995, ICAPP 95, IEEE First ICAPP, IEEE First International Conference on Brisbane, Queensland, Australia, Apr. 19 to 21, 1995, New York, N.Y., USA, IEEE, US, Apr. 19, 1995, pages 891-899, ISBN 0-7803-2018-2, a cycle-based communication system of the type defined above for transmitting useful data between users of the system is known. However, no indication can be found in this publication that in a timeslot of the timeframe in which messages are transmitted with the useful, messages from different users of the system can be transmitted in different transmission cycles on the order of multiplexing.

Belschner, R. et al: Anforderungen an ein zukunftiges Bussystem fur fehlertolerante Anwendungen aus Sicht Kfz-Hersteller [Requirements of a Future Bus System for Error-Tolerant Applications from the Standpoint of Motor Vehicle Manufacturers], VDI-Berichte, Verein Deutscher Ingenieure-Gesellschaft Fahrzeug-und Verkehrstechnik [VDI Reports, Association of German Engineers-Society for Vehicular and Traffic Technology], Vol. 1547, Oct. 6, 2000, pages 23-41, generally describes the requirements of motor vehicle manufacturers for a future communication system. However, no indication of multiplexing the messages in the timeslots of the timeframes can be found in this publication.

Johansson, L. et al: QRcontrol, a Bit-Oriented Communication Concept for Control Systems, QRtech Publication, Jan. 2, 2001, describes a cycle-based communication system for transmitting useful data between users of the system. The communication system described differs from that described above, in particular, in that the known system uses 1-bit-long timeslots. If a user wishes to send a plurality of bits, it requires a plurality of timeslots for the purpose. Moreover, the known communication system makes completely different timeslot sequences per transmission cycle possible. Thus the number of booked timeslots per user consequently changes as a function of the current cycle. In this reference, there is accordingly no fixed chronological association between a timeslot and a user. This lack of a fixed chronological association of the timeslots with specific users of the system represents an important distinction from the communication system of the type defined at the outset above.

BRIEF SUMMARY OF THE INVENTION

The object of the present invention, in data transmission via a cyclical time-based communication system, in which messages are transmitted in timeslots of a fixed length in cyclically repeating timeframes, is to assure optimal support by the protocol for various period lengths.

For attaining this object, the present invention, based on the communication system of the type defined at the outset, proposes that the identifier is stored in the message as part of the message; that the or every message includes data about the cycle; that the timeslots have a fixed length; and that at least one of the timeslots of the timeframes can be used in various cycles for transmitting different messages.

In the timeslot or each timeslot that is usable in various cycles for transmitting different messages, it is possible according to the invention for those messages that need to be transmitted only every $n^{th}$ fundamental cycle to be transmitted offset from one another in different cycles. Thus if in a cycle outside the $n^{th}$ cycle a particular message need not be transmitted, then in that cycle a different message can be transmitted in the corresponding timeslot; there is no need to reserve a waiting time for the message that is not transmitted during that cycle. Thus with the present invention, on the one hand the number of timeslots in a timeframe can be reduced, making it possible to achieve a shorter repetition time for "fast" messages. On the other hand, the individual timeslots of the timeframe are more effectively utilized, and as a result a greater effective bandwidth can be achieved. In particular, messages with a short or long repetition time can be better accommodated in the communication system without losing bandwidth. Moreover, the system design becomes more flexible, and fewer timeslots have to be monitored by a communications controller.

To enable distinguishing the various messages from one another that are transmitted offset from one another in different cycles within the same timeslot, and to make it possible to determine which messages in which cycle will be transmitted within the timeslot, additional data pertaining to the cycles are introduced. A message can be unambiguously defined on the basis of the identifier and the additionally introduced cycle data. The timeslot in which the message will be transmitted is defined by the identifier. The cycle in which the message will be transmitted is defined by the cycle datum.

For sending messages, the users of the communication system observe the data traffic on the data bus and, at regular time intervals, they monitor the cycle data. Within a predeterminable timeslot, the users send a message if the current cycle data match a predeterminable value for the cycle data that is stored in a memory of the user.

For receiving messages over the data bus, the users also observe the data traffic on the data bus. The users check the identifier of the messages transmitted over the data bus. If a message has an identifier that corresponds to a predeterminable identifier, then at least the useful data of the transmitted message are loaded into the user and stored in a memory, for instance, or sent onward. Before the further processing of the useful data, the cycle data are checked. Only in the event that they correspond to a value stored in memory in the user for the cycle data are the useful data further processed.

The cycle data are embodied for instance as a separate cycle counter. Preferably, however, the cycle data are part of the message identifier. Therefore, it is proposed that the messages include, in addition to the identifier, data pertaining to the current cycle. Preferably, the cycle data are part of the identifier and will be processed in the users together with the processing of the identifier. The additional expense in the users for realizing processing of the cycle data can be minimized as a result.

Because each message contains cycle data, and the cycle data are transmitted together with the message, the cycle data can be processed more simply in the users. In particular, messages whose identifier does match a predetermined identifier but which are of no interest to the user in the sense that they were transmitted in the wrong cycle, are prevented from being loaded into the user in the first place at all. Overall, markedly fewer messages are thus stored in a memory of the user. The user memories provided for the useful data or for the message, when new messages or useful data are loaded into the user, are thus overwritten with the new message or the new useful data. The useful data stored in the memory must accordingly be processed by the time new useful data or a new message arrive; if not, they are lost. By using the cycle data, the processing time available for the individual messages received can be increased markedly, since if the cycle data are taken into account, messages are loaded markedly less often into the user than otherwise.

The users of the communication system are each allocated at least one predeterminable timeslot of the timeframe for data transmission. This means that within one timeslot in different cycles, while different messages can be transmitted, these messages are all sent from the same user. The result is decisive simplifications in controlling the sequence of data transmission in the communication system of the invention.

In a preferred embodiment of the present invention, it is proposed that the data about the cycle pertain to the current cycle. Preferably, these data include an ordinal number of the cycle. In the simplest case, the ordinal number has two values: 0 and 1. As a result, odd-numbered cycles can be distinguished from even-numbered cycles. The ordinal number can be increased arbitrarily, to enable distinguishing more cycles from one another.

The messages that are transmitted over the communication system of the invention have the following layout, for instance: The messages are divided into control data and useful data, each type including a plurality of bits. The control data for instance include ten identifier bits, followed by one multiplex bit (MUX bit), one synchronizing bit, and four bits of length information. The identifier bits, together with the MUX bit, form the message identifier. The identifier bits represent the ordinal number of the timeslot within which a message is transmitted. The MUX bit is used as cycle information, or cycle data. From the one-bit-long MUX bit, even- and odd-numbered cycles can be distinguished from one another. As a result, two different messages can be distinguished from one another even though they have the same identifier. It is understood that is also possible to use more than one bit for the additional cycle data, so that four, sixteen, thirty-two or more different cycles can be distinguished from one another.

Advantageously, the time data that pertain to the timeslot and that can be learned from the identifier are assigned to each message. Advantageously, the time data include data about the chronological position of a timeslot within a timeframe. In the users, the transmission duration of the individual timeslots is known. From the identifier of a current message, it can be determined in which timeslot it is transmitted. From the information about the chronological position of the timeslot and the transmission duration of the timeslot, the chronological end of the transmission of the current message and the beginning of transmission of the next message can be determined precisely.

A user of the communication system includes means for comparing time data, assigned to every message and pertaining to the timeslot of the message, with a predeterminable value, stored in a memory of the user, for the time data and means for sending a message, if the time data match the value, stored in the memory, for the time data.

The user can include means for comparing the identifiers of the messages with a predeterminable value, stored in a memory of the user, for the identifier and has means for receiving at least the useful data of a transmitted message, if the identifier of the message matches the predeterminable value for the identifiers stored in the memory. The means for comparing the identifiers of the messages also compare cycle data, assigned to the messages, with predeterminable values, stored in the memory of the user, for the cycle data. The means for receiving at least the useful data of a message receive the useful data only if the identifier and the cycle data of the message match the predeterminable values stored in the memory of the user.

A user of the communication system accordingly does not—as has previously been usual—check the identifier of a message that makes it possible to conclude what the chronological position of the timeslot in which the message is transmitted is within a timeframe. Instead, the user according to the invention also checks cycle data, assigned to the messages, from which it can be determined which cycle the current message was transmitted in.

As another way of attaining the object of the present invention, based on the method for data transmission of the type defined at the outset, it is proposed that the messages are transmitted in timeslots of fixed length; that the identifier is stored in memory in each message as part of that message; that in the or each message, data about the cycle are stored in memory; that in at least one of the timeslots of a timeframe, different messages are transmitted offset from one another in various cycles, and in the at least one timeslot, those messages that are not intended for transmission in every cycle are transmitted offset from one another. The identifier is realized for instance in the ID bits, and the cycle data are realized in the MUX bit or bits of a message.

In an advantageous refinement of the present invention, it is proposed that the users of the communication system are each allocated at least one predeterminable timeslot of the timeframes for data transmission.

In a preferred embodiment of the present invention, it is proposed that data pertaining to the current cycle are additionally stored in memory in the or each message. Preferably, the cycle data are stored in memory in a message as part of the identifier of that message.

Advantageously, the messages transmitted over the data bus in the timeslots of the timeframes are observed by the users of the communication system. The identifiers and the cycle data of the messages are compared with predeterminable values, stored in memories of the observing users, for the identifier and the cycle data. At least the useful data of a transmitted message are received by the user only if the identifier and the cycle data of the message match the predeterminable values, stored in the memory of the user, for the identifier and the cycle data.

Preferably, the data traffic on the data bus of the communication system is observed, and the current cycle data are monitored by the users. A message is sent by a user in a predeterminable timeslot only if the current cycle data match a predeterminable value, stored in a memory of the user, for the cycle data.

DETAILED DESCRIPTION OF THE INVENTION

Figure 1:
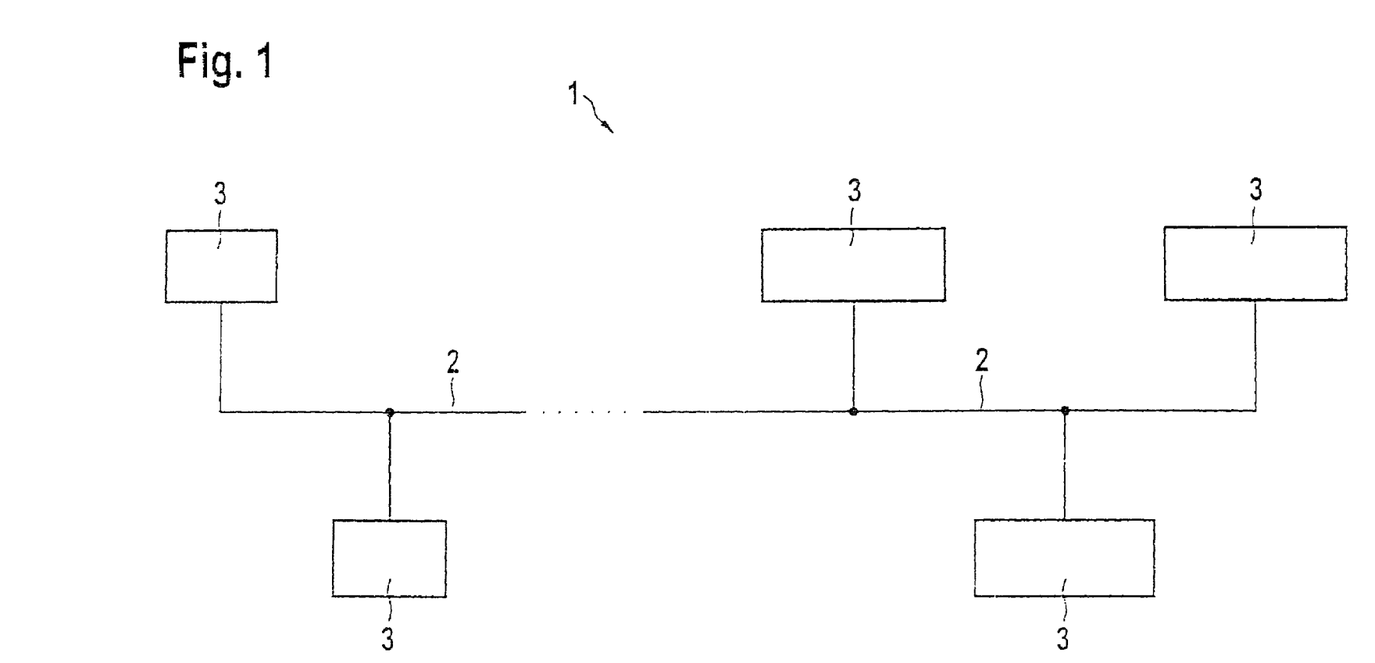
FIG. 1 shows a cyclical time-based communication system in a preferred embodiment of the present invention.

In FIG. 1, a cyclical time-based communication system for transmitting useful data is identified overall by reference numeral 1. The communication system 1 includes a data bus 2 and a plurality of users 3 connected to it. The communication system 1 can be used in arbitrary fields; one preferred field for its use is traffic technology, where the communication system 1 can be used for instance in motor vehicles, trains, aircraft or ships for data transmission between users 3 in the form of control units or simple communications controllers.

Figure 2:
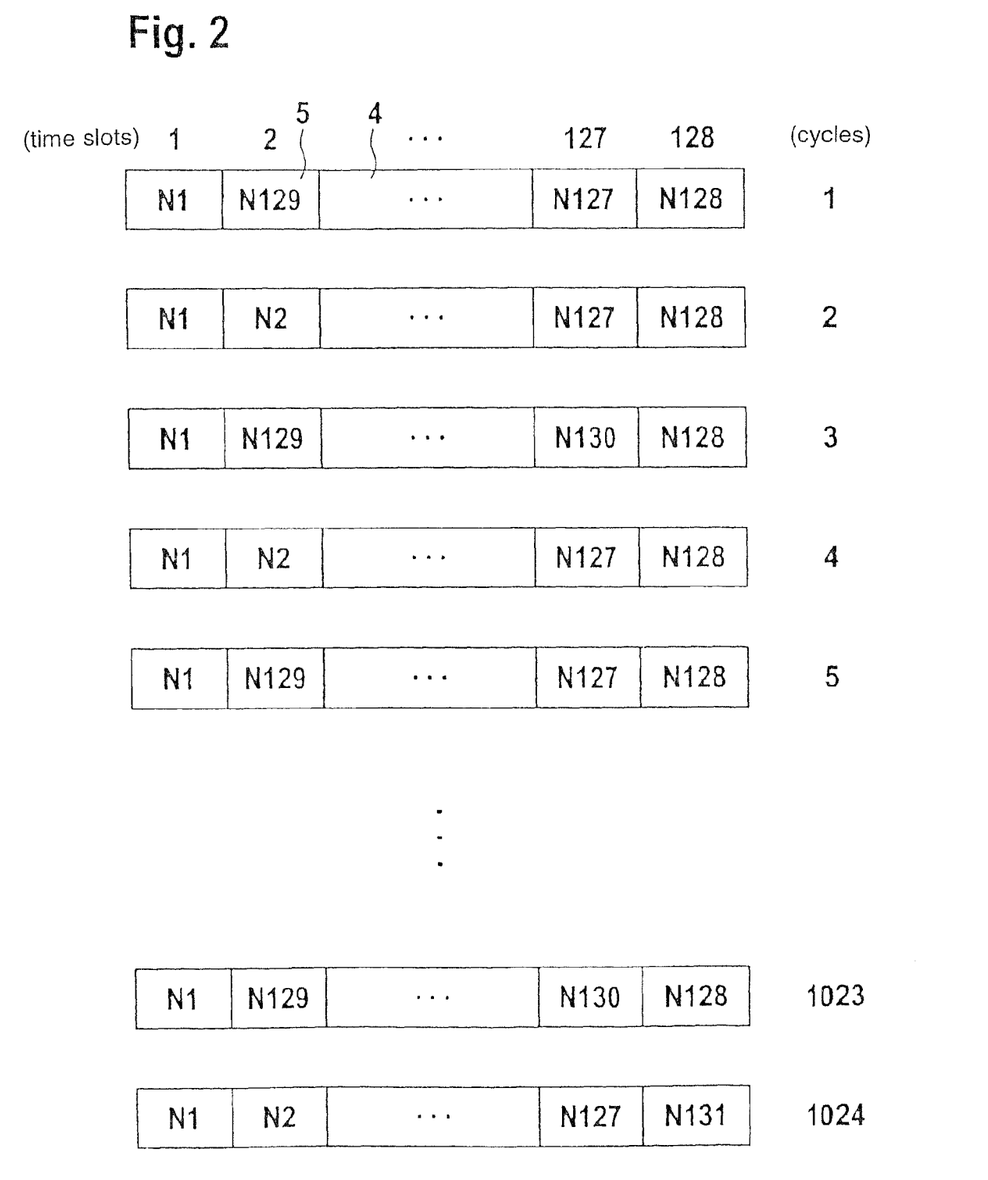
FIG. 2 shows a timeframe with a plurality of timeslots for transmitting messages in the communication system of FIG. 1.

The data transmission in the communication system 1 is effected within cyclically repeating timeframes 4, each having at least two timeslots 5. The timeslots 5 are also known as slots. In FIG. 2, timeframes 4 for a plurality of cycles are shown; in the exemplary embodiment shown, 1024 cycles (zy=1 ... 1024), and each timeframe 4 includes 128 timeslots 5 (zs=1 ... 128). One timeslot 5 is a plurality of bytes in size; in particular, the size of the timeslots 5 ranges between 12 bytes and 240 bytes.

So that data communications over the communication system 1 will be secure and regulated, an agreement about the type of data transmission or so-called protocol is necessary. One such protocol, known from the prior art, is FlexRay, which permits transmitting serial data in time-controlled fashion over the data bus 2. In the process, the useful data to be transmitted or packed into a message, which besides the useful data also contains data on controlling and securing the data traffic (control data). The messages are transmitted cyclically in a fixedly predetermined order in the timeslots 5. The position of the timeslots 5 in the timeframe 4 is determined by an identifier or ID in the message.

In FIG. 2, the individual messages are designated by the symbol Ni (i=1 ... 131). The structure of such a message is shown as an example in FIG. 3a and FIG. 3b. In FlexRay, one timeframe 4 (basic cycle) comprises timeslots 5 that are fixed in every fundamental cycle (for high-priority messages) and variable timeslots 5 (for low-priority messages or for messages with an altered or longer cycle time). The division of one fundamental cycle into fixed and variable timeslots 5 is freely selectable and is influenced by the application within the context of which the data transmission takes place.

In the prior art, the messages Ni have a so-called multiplex bit (MUX bit), as a result of which it is possible to distribute messages over two cycles. The MUX bit is switched by the application in the context of which a message is transmitted over two cycles. When the first part of a relatively large message is transmitted, for instance, the MUX is switched by the application to 0, and when the second part of the message is transmitted, it is set to 1. In the prior art, there is no connection between the current cycle zy and the MUX bit.

Figure 3A:
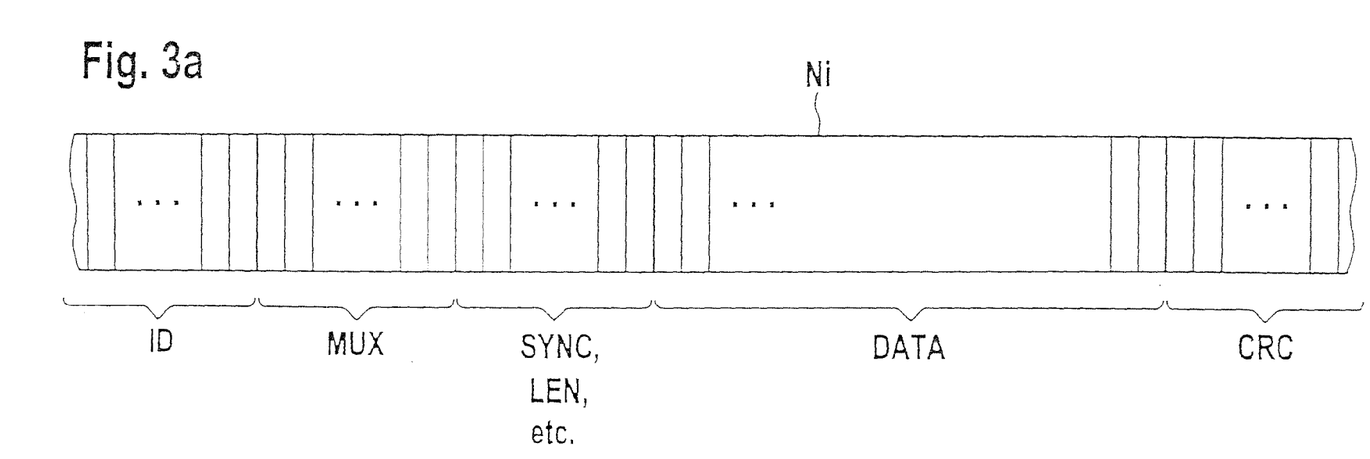
FIG. 3a shows the structure of a message, transmitted in a timeslot of the timeframe of FIG. 2, in a first embodiment.

The MUX bit directly adjoins the identifier (ID) of the messages Ni (see FIG. 3a). In the present invention, the MUX bit is therefore used to store data pertaining to the current cycle in the message. With the aid of one MUX bit, two different cycles, and in particular even- and odd-numbered cycles, can be distinguished from one another. If more than one MUX bit is provided, then more than two cycles can also be distinguished from one another. If the MUX bits provided in the message structure do not suffice to distinguish the desired number of cycles from one another, then according to the present invention the distribution of the ID bits and MUX bits is changed such that the desired number of cycles can be distinguished from one another. In the exemplary embodiment of FIG. 2, for instance, in the message structure at least seven ID bits must be provided for identifying the 128 timeslots in timeframe 4, and at least 10 MUX bits must be provided for distinguishing the 1024 cycles from one another.

Within one message Ni (see FIG. 3a), the identifier ID is provided with a 10-bit length, for instance. By way of the identifier of a current message, the ordinal number of the timeslot 5, over which the message is transmitted, and as a result—since the length (that is, the transmission time) of the individual timeslots is defined and known—the time for the chronological end of the transmission of the current message and the time for the chronological onset of the transmission of the next message are also defined. The identifier ID is adjoined by the MUX bits. The subsequent SYNC or LEN bits include data for controlling and securing data traffic via the communication system 1. In particular, these are a synchronization field (SYNC bit), for instance with a 1-bit length, and a length field (LEN bits), with for instance a 4-bit length. The SYNC bit serves to synchronize the users 3 of the communication system 1 to a common time base. On the basis of the LEN bits, the number of bytes with useful data (DATA bytes) is indicated. The LEN field must for instance include 8 bits, if up to 256 bytes are provided for the useful data. At the end of the useful data (DATA bytes), a security field is provided, which is intended for instance as a cyclic redundancy check (CRC) field, with a length of 16 bits.

Because of the additional cycle data, it is possible for different messages to be transmitted in the same timeslot 5 of a timeframe 4, but in different cycles. This is illustrated for instance in FIG. 2. It can be seen there that in the timeslot zs2 in the cycle zy1, the message N129 is transmitted, and in the cycle zy2 the message N2 is transmitted. In the same way, the message N127 is transmitted in the timeslot zs127 in cycles zy1 and zy2, and the message N130 is transmitted in cycle zy3. Finally, the message N128 is transmitted in the timeslot zs128 in cycles zy1 . . . zy1023, and the message N131 is transmitted in cycle zy1024.

Thus the timeslots zs2, zs127 and zs128 are each used to transmit two different messages N2 and N129; N127 and N130; and N128 and N131, respectively. The messages N2 and N129 are transmitted in every other cycle zy, or in other words in every second cycle. For identification of the messages N2 and N129, a distinction between the cycles zy in even-numbered cycles (for N2) and odd-numbered cycles (for N129) with the aid of one MUX bit would suffice ($2^1=2$). The messages N127 are transmitted in two out of every three cycles zy, and the message N130 is transmitted in every third cycle zy. For identification of the messages N127 and N130, it is necessary to distinguish among three different cycles zy with the aid of at least two MUX bits ($2^2=4$). The messages N128 are transmitted in 1023 of 1024 cycles zy, and the message N131 is transmitted in every 1024.sup.th cycle zy. For identification of the messages N128 and N131, a distinction is necessary among 1024 different cycles zy with the aid of at least ten MUX bits ($2^{10}=1024$).

With the present invention, it is possible to dispense with additional timeslots 4 for the messages N129, N130 and N131. For transmitting these messages, instead, timeslots 4 that are already present for the messages N2, N127 and N128 are used in those cycles in which the messages N2, N127 and N128 are not transmitted. In this way, the total length of the timeframes 4 and thus also the cycle time can be reduced. Thus the bandwidth of the data transmission is increased. Overall, the design of the communication system 1 becomes substantially more flexible. The number of timeslots 5 to be monitored in a bus guardian becomes less.

For realizing the present invention, it must be possible—as already described above—to distinguish the various cycles from one another. To that end, either an additional cycle datum MUX, integrated with the identifier ID of the messages Ni (see FIG. 3a), or a separate cycle counter (see FIG. 3b) can be used. For transmitting one cycle counter in one message Ni, at least one of the data bytes (=8 bits) can for instance be used. The cycle counter is an independent counter, which is incremented (or decremented) after every cycle and which must be polled separately from time to time.

Figure 3B:
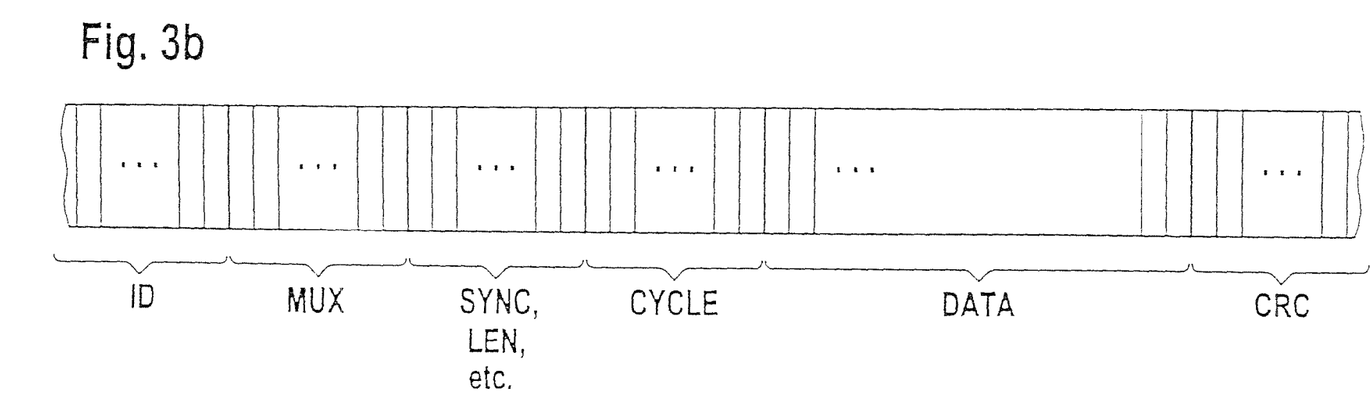
FIG. 3b shows the structure of a message, transmitted in a timeslot of the timeframe of FIG. 2, in a second embodiment.

By means of the cycle counter, the number of cycles to be multiplexed can be increased still further, if an application requires this. As a result, even very long repetition times (many cycles) can be achieved.

According to the invention, a variable distribution of the ten time-determining ID bits and the MUX bits into a combination of 7+4, 8+3, 9+2, or 10+1 is conceivable to enable distinguishing 16, 8, 4 or 2 different cycles in which, in identical timeslots, either 16, 8, 4 or 2 different messages Ni are transmitted. It is thus possible to distribute the messages over 16, 8, 4 or 2 cycles, as a result of which the period length of the cycles can be increased, without having to make do without short repetition times of the cycles for "fast" messages.

Figure 4A:
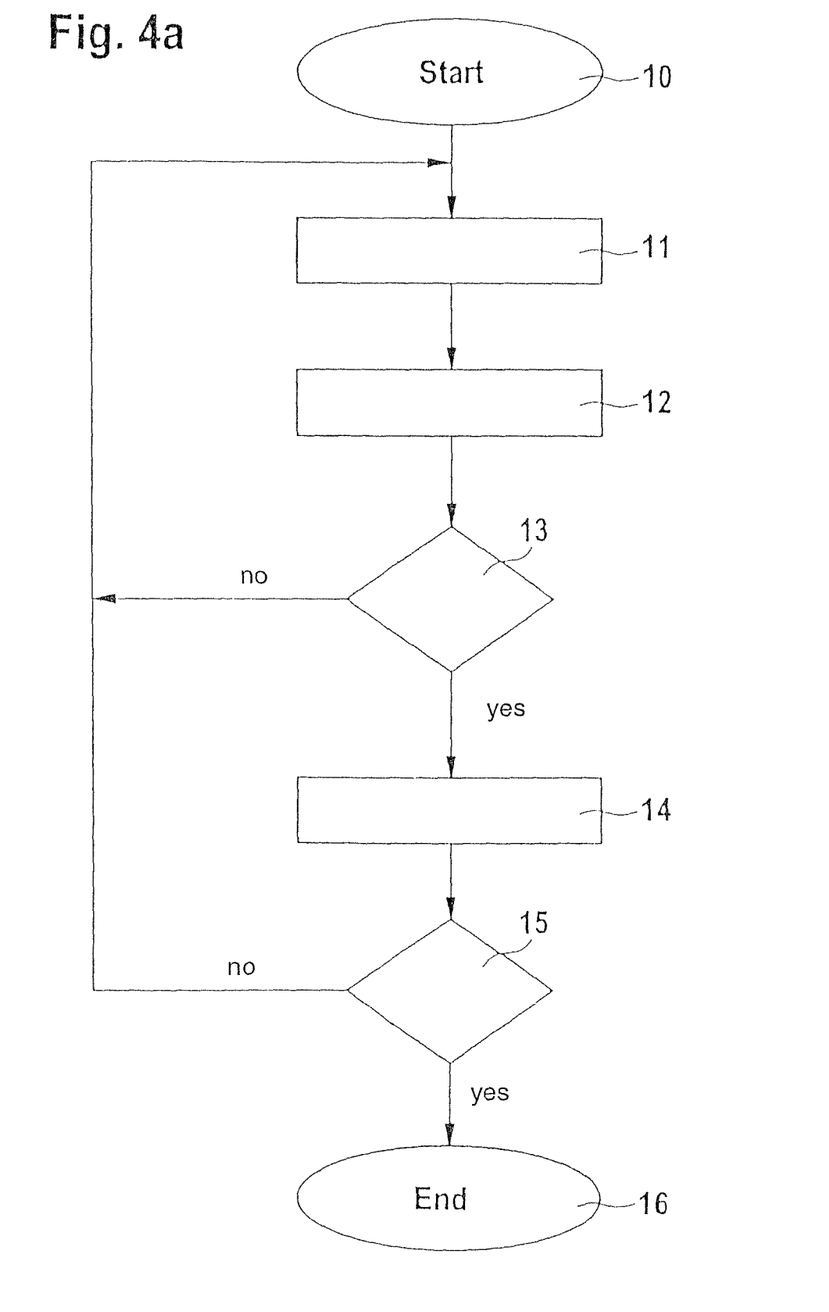
FIG. 4a shows a flow chart of a method according to the invention for sending useful data via the communication system of FIG. 1.

In FIG. 4a, a flow chart of a method according to the invention for sending useful data is shown. The method begins in a function block 10. In a function block 11, a user 3 which would like to transmit the useful data over the communication system 1, observes the communication on the data bus 2. To that end, the user 3 writes at least the data for controlling and securing the data traffic for the messages Ni transmitted over the data bus 2, even if these messages are not intended for that user. Then, in a function block 12, the user 3 ascertains the onset of transmission of the message following the current message Ni, or the onset of the timeframe following the current timeframe. The onset of transmission of the next message is ascertained from the identifier ID of the current message Ni and from the chronological duration, which is known to the user, of the individual timeslots 5 of the timeframe 4.

In a polling block 13, it is asked whether the instant of the onset of the next data transmission is the predetermined transmission instant for the user 3. If the answer is no, a jump is made to function block 11, and the communication over the data bus 2 continues to be observed. If the answer is yes, in a function block 14, the user 3 sends the useful data to be transmitted over the data bus 2 in a message Ni. Next, in a polling block 15, it is checked whether the method is ended, for instance because of a turn-off (power-down) command. If the answer is yes, the method of the invention is ended in a function block 16. If the answer is no, the method is continued in function block 11.

Figure 4B:
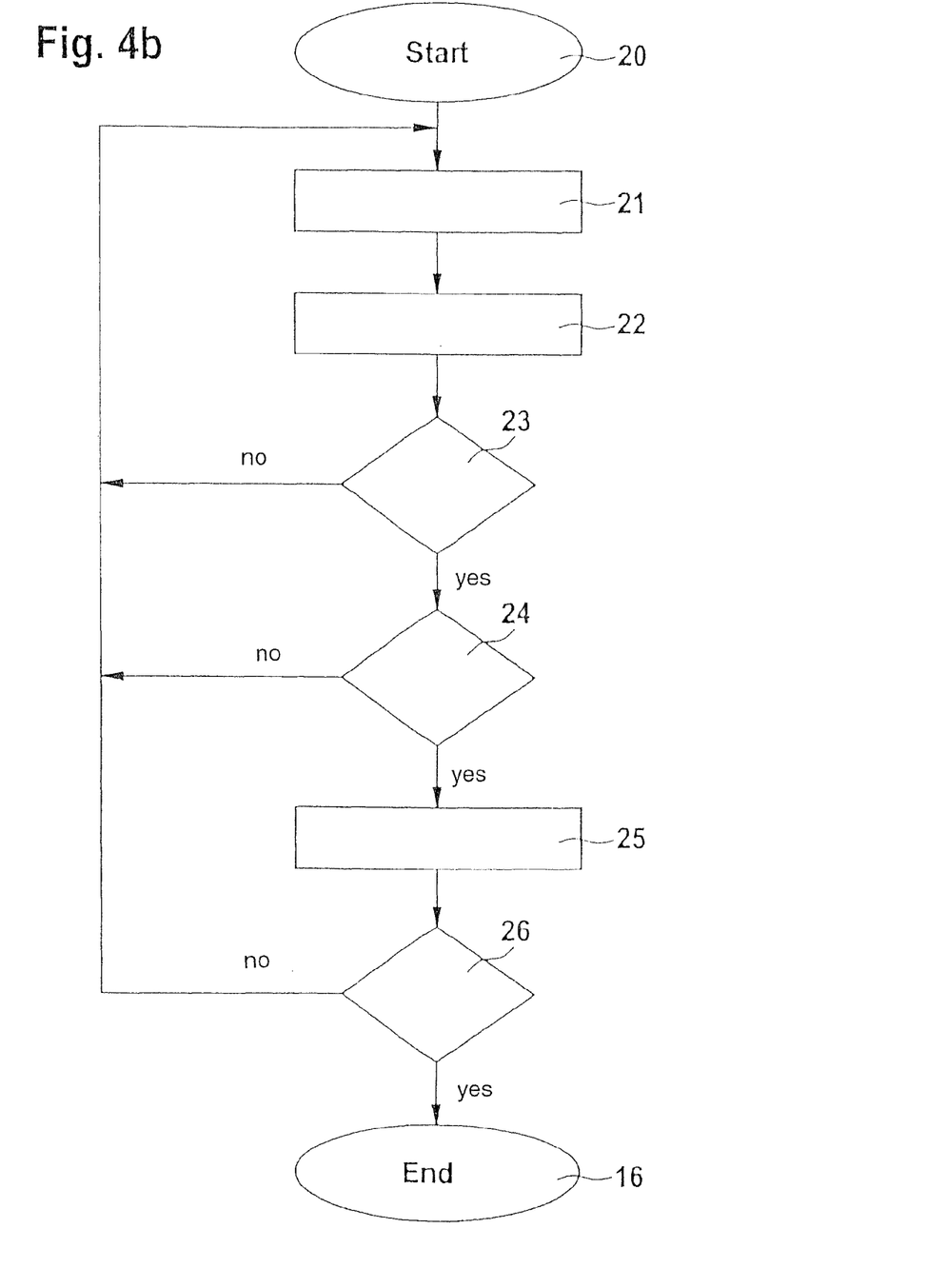
FIG. 4b shows a flow chart of a method according to the invention for receiving useful data via the communication system of FIG. 1.

In FIG. 4b, a flow chart is shown for a method of the invention for receiving a method with useful data from the data bus 2. The method begins in function block 20. In a function block 21, a user 3 which would like to receive the useful data via the communication system 1, observes the communication over the data bus 2. To that end, the user 3 writes at least the data for controlling and securing the data traffic of the messages Ni transmitted over the data bus 2, even if these messages are not intended for it. The user 3 does not known whether a message Ni is intended for it until it has written in the data from the message Ni and processed it. In the course of the processing, the user 3, in a function block 22, writes both the identifier ID and the cycle data in the form of the MUX bits of a current message Ni. In a polling block 23, it is checked whether the identifier ID of the message Ni matches the predeterminable value, stored in a memory of the user 3, for the identifier ID. If the answer is no, the message is not intended for that user 3, and the method is continued in function block 21, whether the data bus 2 is observed further. If the answer is yes, the method is continued in a polling block 24.

In the polling block 24, it is checked whether the message Ni, which appears from its identifier ID only to be intended for the user 3, is in fact intended for the user 3. To that end, it is checked whether the cycle data of the current message Ni match the predeterminable values, stored in the memory of the user 3, for the cycle data. In the exemplary embodiment of FIG. 2, the messages N2 and N129, for instance, would have the same identifier ID. Nevertheless, one message may be intended for one user while the other message is intended for another user. The cycle data can provide conclusive information on this point. Even-numbered cycles are intended for one user, while odd-numbered cycles are intended for the other user.

If the cycle data in the current message Ni do not match the values, stored in the memory of the user 3, for the cycle data, a jump is made to function block 21, and the data bus 2 is observed further. Otherwise, this means that the current message Ni is in fact intended for the user 3. The method is continued in a function block 25, in which at least the useful data in the message Ni are loaded from the data bus 2 into the user 3 and there either stored in the memory of the user 3, further processed, or sent onward. Next, in a polling block 26, it is checked whether the method is ended, for instance because of a power-down command. If the answer is yes, the method of the invention is ended in a function 27. Otherwise, the method is continued in function block 21.

The flow charts shown in FIGS. 4a and 4b can be embodied in every user 3 of the communication system 1.

The foregoing relates to preferred exemplary embodiments of the invention, it being understood that other variants and embodiments thereof are possible within the spirit and scope of the invention, the latter being defined by the appended claims.

We claim:

1. A cycle-based communication system for transmitting useful data between users of the system, including:
   a data bus and the users connected to the bus, wherein in the system a data transmission is effected within cyclically repeating timeframes with at least two timeslots each, and each of the timeslots is intended for transmitting one message of a plurality of messages, the one message contains at least some of the useful data, and each of the messages is assigned a message identifier;
   wherein the system further includes a user memory containing data about a cycle and a message identifier having a predetermined value,
   wherein the assigned message identifier is stored in each of the messages as part of each of the messages; each of the timeslots has a fixed length; and at least one of the timeslots of one of the timeframes can be used, in various cycles for offset transmission of different messages of the plurality of messages that are not intended for transmission in every cycle,
   wherein a data about a cycle is either (i) integrated with the assigned message identifier of each of the messages, or (ii) a separate cycle counter integrated in each of the messages,
   wherein each of the messages is additionally assigned time data that pertain to one of the timeslots and is learned from the assigned message identifier of each of the messages,
   wherein messages of no interest to a user are determined according to the data about the cycle contained in each of the messages; and
   wherein each of the messages transmitted over the communication system whose assigned message identifier matches the message identifier having the predetermined value contained in the user memory but which are determined according to the data about the cycle contained in each of the messages to be of no interest to the user, are prevented from being loaded into the user.

2. The communication system of claim 1, wherein the data about the cycle in each of the messages pertain to a current cycle.

3. The communication system of claim 2, wherein the data pertaining to the current cycle include an ordinal number of a cycle.

4. The communication system of claim 1, wherein the time data include data about a chronological position of one of the timeslots within one of the timeframes.

5. The communication system of claim 1, wherein either a MUX bit is used to store data pertaining to a current cycle in the one message or a separate cycle counter is used to store data pertaining to the current cycle in the one message.

6. A method for transmitting useful data in a cycle-based communication system between users of the system connected via a data bus, wherein the system includes a user memory containing data about a cycle and a message identifier having a predetermined value, said method comprising the steps of:
   transmitting the useful data within cyclically repeating timeframes each with at least two timeslots, and in each of the timeslots transmitting one message of a plurality of messages, wherein at least some of the useful data are contained in the one message, and each of the messages is assigned a message identifier and cycle data, the assigned message identifier being stored in each of the messages as part of each of the messages, and each of the messages being transmitted in the timeslots of fixed length, wherein
   in at least one of the timeslots of one of the timeframes, transmitting different messages of the plurality of messages, that are not intended for transmission in every cycle, offset from one another in various cycles;
   wherein the assigned cycle data is either one of (i) integrated with the assigned message identifier of each of the messages, or (ii) a separate cycle counter integrated in each of the messages;
   additionally assigning each of the messages time data that pertain to one of the timeslots and is learned from the assigned message identifier of each of the messages;
   comparing the assigned message identifier of each of the messages to the message identifier having the predetermined value contained in the user memory;

determining according to the assigned cycle data contained in each of the messages which messages of the plurality of messages are of no interest to a user; and preventing messages of the plurality of messages transmitted over the communication system, which are of no interest to the user as determined according to the assigned cycle data contained in each of the messages, from being loaded into the user.

7. The transmission method of claim 6, wherein each of the users of the communication system is allocated at least one predeterminable timeslot of the timeframes for data transmission.

8. The transmission method of claim 7, wherein data pertaining to a current cycle is stored in each of the messages.

9. The transmission method of claim 8, wherein data traffic on the data bus of the communication system is observed; current cycle data are monitored by each of the users; and a message is sent by the user in a predeterminable timeslot only if the current cycle data match a predeterminable value, stored in a memory of the user, for the data pertaining to the current cycle.

10. The transmission method of claim 6, wherein data pertaining to a current cycle is stored in each of the messages.

11. The transmission method of claim 10, wherein the data pertaining to the current cycle is stored in each of the messages as part of the assigned message identifier of each of the messages.

12. The transmission method of claim 11, wherein data traffic on the data bus of the communication system is observed; current cycle data are monitored by each of the users; and a message is sent by the user in a predeterminable timeslot only if the current cycle data match a predeterminable value, stored in a memory of the user, for the data pertaining to the current cycle.

13. The transmission method of claim 10, wherein data traffic on the data bus of the communication system is observed; current cycle data are monitored by each of the users; and a message is sent by the user in a predeterminable timeslot only if the current cycle data match a predeterminable value, stored in a memory of the user, for the data pertaining to the current cycle.

14. The transmission method of claim 6, wherein either a MUX bit is used to store data pertaining to a current cycle in the one message or a separate cycle counter is used to store data pertaining to the current cycle in the one message.

* * * * *